United States Patent Office 3,654,165

Patented Apr. 4, 1972

3,654,165

TELEPHONE CLEANER-SANITIZER

Stanley Charles Bryant and Kenneth H. Mohlhenrich, Baltimore, Md., assignors to said Bryant and to Denis T. Lynch, Reisterstown, Md., fractional part interest to each No Drawing. Filed Sept. 10, 1970, Ser. No. 71,268
Int. Cl. C11d *3/48, 17/00*
U.S. Cl. 252—90 7 Claims

ABSTRACT OF THE DISCLOSURE

A cleaner-sanitizer specifically for wiping application to telephone instruments, including a fast-acting, penetrative, quick-drying bacteriocidal detergent solution, which leaves a safe, active residue, comprised of selected proportions of sodium lauryl sulfate, dimethyl sulfone, isopropanol, and iodine, in solution; use of the above in combination with a lint-free wiper is also disclosed.

This invention relates generally to telephone instrument cleanliness and specifically to means and method for cleaning and disinfecting for extended times the transmitters and receivers of ordinary telephones.

In the prior art various special devices have been proposed for the purpose of sanitizing telephone instruments, including principally three types: filters, positioned in or over the transmitter section, radiation devices, and disinfectant dispensers attached to one part or another of the instrument. The first classification is the only one which aims at prevention of accumulation of foreign material; the other two simply attempt to sanitize the foreign material.

Hand wiping of telephone instruments has long been the usual method used for cleaning, but has suffered the drawbacks of causing foreign matter to accumulate in perforations and other interstices of the instruments, without thoroughly disinfecting the foreign matter. This problem is compounded in high speed operations. In large-scale in-service commercial cleaning, because of today's labor costs and because of today's intensive use of telephone equipment, it is commercially unfeasible to allot more than a few seconds to each instrument or to interrupt service on each instrument for more than a few seconds.

Although the telephone is a permanent part of everyone's environment, and although telephone users quickly perceive that receivers and transmitters which have been in use for some time have become visibly filthy, when the problem is pointed out to them, there is little current effort to reduce this environmental pollution. Esthetic considerations aside, the potential of telephone instruments for promoting epidemics is obviously great, particularly in view of the new evolving strains of disease, which, judging by the speed with which they spread, are highly contagious.

Objects of the present invention are therefore to provide a telephone cleaning-sanitizing means and method which is adapted to make the use of telephone instruments drastically safer at a commercially acceptable cost, and without alteration of or damage to the instruments or interruption of service.

In essence the means and method of this invention comprise provision of a new highly solvent, quick-drying, safe, but persistently disinfectant chemical compound in the form of a solution specifically designed for periodic wiping, cleaning and disinfecting of telephone instruments in a minimum of time and without corrosive or cumulative-residue effects, together with designation of a special material in combination therewith for hand application of the chemical to telephone instruments.

The above and other objects and advantages of the present invention will become more apparent upon examination of the following description.

The telephone cleaner disinfectant solution of this invention comprises in representative embodiment essentially the following constituents in the approximately preferred proportions noted (making 115 ml. solution):

Sodium lauryl sulfate (30% in $H_2O$)—about 25 ml.
Dimethyl sulfone (10% in $H_2O$)—about 10 ml.
Isopropanol (99%)—about 80 ml.
Iodine—about .5 gr.

In the above unique compound, sodium lauryl sulfate, which is a non-toxic detergent, is primarily included for surface cleaning. The dimethyl sulfone, also non-toxic is combined with this to provide further cleaning action by dissolving residues not removed by the action of the detergent alone. In combination with the above, the isopropanol provides some bacteriocidal action, and complete, quick-drying action, promoting speed in cleaning without leaving telephone instruments wet or slippery. The iodine provides, in the combination recited, both immediate and residual bacteriocidal action, as will be noted.

No special mode of preparation of the solution is necessary. The solution is applied to a sheet of wiping material which is then used to clean the telephone instrument.

Although the reasoning underlying the formulation of this compound is given above, it is believed that the remarkable action is not patently explainable by reference to known properties of the individual components.

Results of a series of bacteriological testing of the cleaning effectiveness of the above formulation in one commercial establishment were as follows:

| Telephone location | No. of bacteria 8 sq. in. before cleaning | No. of bacteria 8 sq. in. after cleaning |
|---|---|---|
| Office A | 220,000 | 6 |
| Office B | 240 | 3 |
| Office C | 18,000 | 330 |
| Office D | 22,000 | 30 |
| Security kiosk | 6,300 | 180 |
| Warehouse | 2,200 | 20 |

Typical time between counts was approximately five minutes.

Other proportions of the constituents (in the same concentrations noted) will be found effectual in combination between limits as follows:

| | Approximate upper limit | Approximate lower limit |
|---|---|---|
| Sodium lauryl sulfate, ml | 30 | 15 |
| Dimethyl sulfone, ml | 20 | 5 |
| Isopropanol, ml | 125 | 75 |
| Iodine, gr | 1 | 0.5 |

Greater amounts of sodium lauryl sulfate would tend to produce foaming and to leave sticky residues; lesser amounts would unduly reduce the cleaning action. Adding excess dimethyl sulfone would leave a visible crystalline residue upon drying, and smaller quantities than recommended would provide little noticeable effect. Larger quantities of isopropanol would unduly diminish the combined action of the ingredients, and smaller quantities would not provide the required bacteriological action.

In addition to the constituents above, a few drops of an oil base perfume can be added to give a pleasant scent to the solution. For instance, "Citropene," a proprietary product of the Sindar Corportation, 321 W. 44th St., New York, N.Y. can be used for the purpose.

Inspection of telephone instruments before cleaning reveals unexpectedly large amounts of deposited or otherwise accumulated matter. It is commercially unfeasible to attempt to remove all the material, since this would involve carefully disassembling the instrument, dip-cleaning, disinfecting and drying the exterior parts of it, and carefully reassembling it, all of which are time-consuming.

Such time-consuming operations are made unnecessary by the present invention.

Surprisingly little treatment of a badly contaminated telephone instrument with the above compound is required to reduce the bacteria count to acceptable testing-laboratory levels and to produce a clean looking instrument. In the table above, the before-treatment bacteria counts on the various previously untreated instruments are believed to reflect typical conditions throughout the country and the rest of the world.

Also in the table above, the after-treatment bacteria counts on the various instruments are believed to represent typical results. Importantly, these results were obtained by brief wiping only, without disassembly of any parts of the instruments, using only a wiper moistened with cleaner-sanitizer solution of this invention. It was found that, using this solution, the wiper, which will be described below, need be moistened only to an extent providing practically instantaneous drying after wiping. This points up several inventive advantages over the prior art as represented by alcohol alone or other generalized cleaners. First, the solution of this invention dissolves and removes layers of filth deposited by humans on telephone transmitters and receivers with surprising speed. Secondly, the surprisingly small amount of solution found necessary to clean and sanitize an instrument, coupled with the high rate of evaporation eliminates the danger of dripping or running dissolved contaminants into the interior of the instrument. Thirdly, the sanitizing disinfectant characteristic of the solution is such that any foreign matter forced into very tiny interstices in the instrument by the wiping will be disinfected through the fast-penetrating and the persistent qualities of the compound. Because of the quick evaporation, the wiping method of application, and the small amount of solution necessary only a very small amount of the cleaner-sanitizer remains as a dry film on the instrument. This film provides a day-to-day lingering sanitative effect. At the next periodic wiping, any residual quantity of this film is removed and replaced by a fresh film. However, the film is so thin that there is no toxic danger even in the hands of an infant, and the iodine content as noted above, although effective, is insufficient to discolor light colored instruments.

Surprisingly also, the solution, although extremely quick-acting and effective, is not corrosive or in any way deleterious to telephone instruments. Repeated wiping produces a clean appearance and smell, without any other change detectable by the senses.

Because telephone receivers and transmitters are typically perforated structures, it is important not to force loose material such as cloth fibres into the interiors through the perforations; the wiper designated for use with the solution of this invention is therefore thin, porous, non-linting, wet-strength, sheet material which is not attacked by the solution, such as lens paper, non-woven rayon, or the like, and such material uniformly impregnated with the solution may be supplied.

Obviously many modifications and variations of the present invention are possible in light of the above teachings. It is, therefore, to be understood that within the scope of the appended claims the invention may be practiced otherwise than as specifically described.

I claim:

1. A telephone cleaner-sanitizer solution for wipe-on application to telephone instruments, consisting essentially of the following substances within the proportional ranges given:

sodium lauryl sulfate (30% in $H_2O$): 15 ml. to 30 ml.
dimethyl sulfone (10% in $H_2O$): 5 ml. to 20 ml.
isopropanol: 75 ml. to 125 ml.
iodine: 0.5 gr. to 1 gr.

2. A cleaner-sanitizer solution as recited in claim 1, wherein the substances are in the approximate range of proportions:

sodium lauryl sulfate (30% in $H_2O$): 15 ml. to 30 ml.
dimethyl sulfone (10% in $H_2O$): about 10 ml.
isopropanol (99%): about 80 ml.
iodine: about .5 gr.

3. A cleaner-sanitizer solution as recited in claim 1, wherein the substances are in the approximate range of proportions:

sodium lauryl sulfate (30% in $H_2O$): about 25 ml.
dimethyl sulfone (10% in $H_2O$): 5 ml. to 20 ml.
isopropanol: about 80 ml.
iodine: about .5 gr.

4. A cleaner sanitizer solution as recited in claim 1, wherein the substances are in the approximate range of proportions:

sodium lauryl sulfate (30% in $H_2O$): about 25 ml.
dimethyl sulfone (10% in $H_2O$: about 10 ml.
isopropanol (99%): 75 ml. to 125 ml.
iodine: about .5 gr.

5. A cleaner sanitizer solution as recited in claim 1, wherein the substances are in the approximate range of proportions:

sodium lauryl sulfate (30% in $H_2O$): about 25 ml.
dimethyl sulfone (10% in $H_2O$): about 10 ml.
isopropanol (99%): about 80 ml.
iodine: 1 gr. to 0.5 gr.

6. A cleaner sanitizer solution as recited in claim 1, wherein the substances are in the approximate range of proportions:

sodium lauryl sulfate (30% in $H_2O$): 25 ml.
dimethyl sulfone (10% in $H_2O$): 10 ml.
isopropanol (99%): 80 ml.
iodine: 0.5 gr.

7. As an article of manufacture, a telephone cleaner-sanitizer for wiping cleaning of telephone instruments, comprising: a thin sheet of porous, non-linting material uniformly impregnated with a solution consisting essentially of the following substances in approximately the following proportions:

sodium lauryl sulfate (30% in $H_2O$): 25 ml.
dimethyl sulfone (10% in $H_2O$): 10 ml.
isopropanol: 80 ml.
iodine: 0.5 gr.

References Cited

UNITED STATES PATENTS

| | | | |
|---|---|---|---|
| 2,599,140 | 6/1952 | Taub | 252—121 |
| 2,959,517 | 11/1960 | Bowers et al. | 167—22 |

FOREIGN PATENTS

| | | |
|---|---|---|
| 1,426,139 | 12/1965 | France. |
| 963,305 | 7/1964 | Great Britain. |

LEON D. ROSDOL, Primary Examiner

P. E. WILLIS, Assistant Examiner

U.S. Cl. X.R.

252—106; 424—150